No. 896,534. PATENTED AUG. 18, 1908.
A. L. HART.
NUT LOCK.
APPLICATION FILED APR. 10, 1908.

Witnesses
J. R. Mahaney
X. H. Butler

Inventor
A. L. HART,
By H. C. Everett Co.
Attorneys

UNITED STATES PATENT OFFICE.

ABRAHAM L. HART, OF BARNESVILLE, OHIO.

NUT-LOCK.

No. 896,534.     Specification of Letters Patent.     Patented Aug. 18, 1908.

Application filed April 10, 1908. Serial No. 426,385.

*To all whom it may concern:*

Be it known that I, ABRAHAM L. HART, a citizen of the United States of America, residing at Barnesville, in the county of Belmont and State of Ohio, have invented certain new and useful Improvements in Nut-Locks, of which the following is a specification, reference being had therein to the accompanying drawing.

This invention relates to a nut lock, particularly designed for railway, automobile, carriage, wagon and machinery construction, and the primary object of my invention is to provide a novel nut, in connection with which positive and reliable means are employed for retaining the nut in engagement with the bolt.

A further object of my invention is to provide a simple, durable and inexpensive nut lock that can be easily and quickly placed in engagement with the nut to lock the same upon a bolt.

With the above and other objects in view which will readily appear as the invention is better understood, the same consists in the novel construction, combination and arrangement of parts to be presently described and then specifically pointed out in the appended claim.

Figure 1:
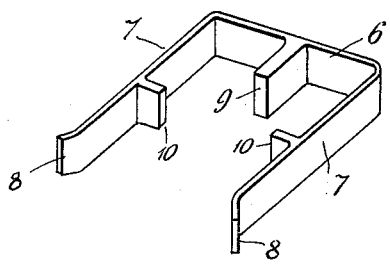
Figure 2:
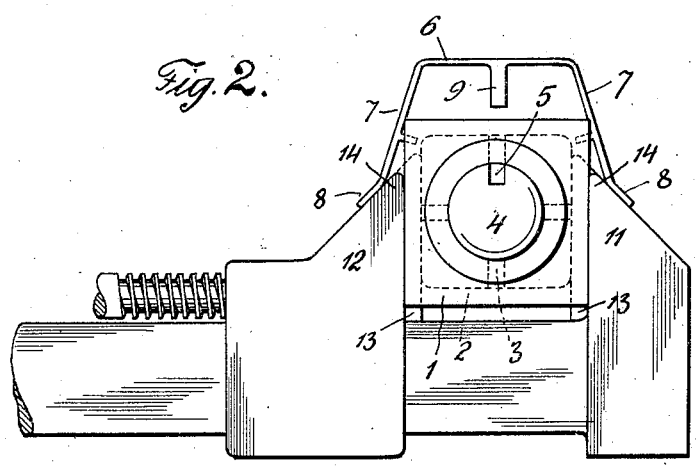

In the drawings, Figure 1 is a perspective view of my nut lock. Fig. 2 is an elevation of the nut lock and a nut, together with a suitable implement, illustrating the manner in which the lock is removed from the nut.

To put my invention into practice, I provide the sides of a nut 1 with grooves 2 and each side with an opening 3, said grooves entirely surrounding the nut, and each groove is formed at right angles to the openings 3, which communicate with the bore of the nut. The nut 1 is adapted to screw upon the bolt 4 which is provided with a longitudinal groove 5, said groove extending from one end of the threaded portion of said bolt to the opposite end thereof.

Adapted to embrace the nut 1 and engage in the grooves 2 thereof is a resilient lock, comprising a U shaped strap the arms 7 of which are connected at one end by a cross-bar 6 and at their free ends are bent out slightly or flared, as at 8. The cross bar 6 of the strap is provided with an inwardly projecting lug 9 and the arms 7 have similar lugs 10, said lugs 9 and 10 adapted to engage in the openings 3 of the nut 1. The lug 9 is longer than the lugs 10 and is adapted to protrude through the opening 3 in which it is inserted and engage in the groove 5 of the bolt, thereby preventing the nut 1 from rotating upon said bolt.

In Fig. 2 of the drawings, I have illustrated a suitable implement, as a wrench for removing the strap from a nut and bolt. The fixed jaw 11 and the adjustable jaw 12 are provided with confronting ribs 13, adapted to engage in the grooves 2 of the nut 1. The tapering ends 14 of the jaws are adapted to engage the resilient arms of the strap and spread the same, and by forcing the wrench upon the nut, the lock can be forced out of engagement with the nut, permitting of the wrench being used to rotate the nut upon the bolt.

Having now described my invention what I claim as new, is:—

In a nut lock, the combination with a bolt provided with a longitudinal groove, and a nut provided with a continuous peripheral groove and having an opening in each side thereof, of a substantially U-shaped locking strap embodying a pair of resilient side arms and a cross bar connecting the side arms at one end thereof, oppositely-disposed lugs projecting inwardly from the inner faces of said side arms, said lugs adapted to engage in the openings provided therefor in opposite sides of said nut, and a lug projecting inwardly from said cross bar to engage in another of the openings in said nut, said lug carried by the cross bar being of greater length than the lugs carried by the side arms so as to protrude through the nut opening in which it is received and engage in the groove in said bolt.

In testimony whereof I affix my signature in the presence of two witnesses.

ABRAHAM L. HART.

Witnesses:
   E. S. FLOYD,
   J. B. BARNES.